United States Patent [19]

Pringle

[11] Patent Number: 4,805,744
[45] Date of Patent: Feb. 21, 1989

[54] BRAKE ACTUATOR ASSEMBLY AND METHOD

[76] Inventor: William L. Pringle, 999 Lake Shore Rd., Grosse Pointe Shores, Mich. 48236

[21] Appl. No.: 422,705

[22] Filed: Sep. 24, 1982

[51] Int. Cl.⁴ .................... F16D 55/36; F16D 65/24; F01B 19/00; B60T 13/00
[52] U.S. Cl. .................................. 188/71.5; 92/107; 188/170; 188/366; 303/9.76
[58] Field of Search ................ 188/71.5, 72.3, 71.3, 188/71.4, 73.1, 72.4, 216, 218 XL, 264 E, 73.2, 72.1, 369, 170, 72.5, 290, 73.45, 298, 151 R, 366; 192/70.28, 85 AA; 403/50, 51; 92/107, 108; 303/71, 6 M, 9.76

[56] References Cited

U.S. PATENT DOCUMENTS

| | | | |
|---|---|---|---|
| 2,174,240 | 9/1939 | Glenney | 192/70.28 |
| 2,256,725 | 9/1941 | Pierce et al. | 188/369 |
| 2,381,393 | 8/1945 | Brown | 188/72.3 |
| 2,653,692 | 9/1953 | Polomski, Jr. | 192/70.28 |
| 2,877,668 | 3/1959 | Kelbel | 92/107 |
| 3,072,220 | 1/1963 | Bernson et al. | 188/264 E |
| 3,174,602 | 3/1965 | Schojolin | 192/70.28 |
| 3,250,138 | 5/1966 | Ernst | 403/51 |
| 3,770,085 | 11/1973 | Cottingham | 188/170 |
| 3,827,534 | 8/1974 | Brooks | 188/68 |
| 3,927,737 | 12/1975 | Prillinger et al. | 188/366 |
| 4,003,606 | 1/1977 | Plantan | 188/170 X |
| 4,408,746 | 10/1983 | Marsch et al. | 188/170 |

FOREIGN PATENT DOCUMENTS 0001297 of 1885 United Kingdom ............... 188/73.1

Primary Examiner—Andres Kashnikow
Assistant Examiner—Robert J. Oberleitner
Attorney, Agent, or Firm—Reising, Ethington, Barnard, Perry & Milton

[57] ABSTRACT

A hydraulic brake actuator assembly (12) for selectively actuating a friction brake 28 including a first hydraulic actuator 30 being responsive to fluid pressure from a hydraulic fluid source 100 for directly actuating the friction brake 28 as a service brake. The assembly (12) is characterized by including a second actuator 32, 32' being in fluid communication with the first actuator 30 and having a brake-off condition for storing fluid therein and a brake-on condition for releasing the stored fluid to the first actuator 30 to actuate the friction brake 28 as a parking brake.

A method of selectively actuating the friction brake 28 includes the steps of storing fluid in the second actuator 32, 32' as the first actuator 30 is responsive to fluid pressure from the fluid source 100 to actuate the friction brake 28 as a service brake, and releasing the stored fluid from the second actuator 32, 32' to the first acutator 30 to actuate the friction brake 28 as a parking brake.

3 Claims, 5 Drawing Sheets

BRAKE ACTUATOR ASSEMBLY AND METHOD

TECHNICAL FIELD

This invention relates to a brake actuator assembly to be operated with a friction brake, such as a disc or cone brake, for selectively actuating the brake into and out of frictional braking engagement. More specifically, the instant invention relates to a brake actuator assembly including a first actuator for actuating the friction brake as a service brake and a second brake actuator which actuates the first actuator to apply the friction brake as a parking brake.

BACKGROUND ART

Many prior art patents are directed to hydraulically actuated disc brakes which include mechanical means to actuate the brake as a parking brake. For example, the U.S. Pat. No. 3,827,534 to Brooks discloses a brake actuator assembly which incorporates a spring-actuated sliding bolt which mechanically applies the parking brake. Other prior art patents teach brake actuator constructions which utilize spring biased pistons for providing standby fluid pressure to apply the brake force in response to a loss of fluid pressure in the brake system. However, none of the aforementioned patents teach the concept of using a separate fluid circuit to actuate a fluid-actuated service brake as a parking brake. Additionally, there are prior art patents which disclose a bellows-type actuator replacing the larger, heavier and more costly piston-type actuator.

STATEMENT OF THE INVENTION

According to the present invention, there is provided a hydraulic brake actuator assembly for selectively actuating a friction brake. The assembly includes a first actuator being responsive to fluid pressure from a hydraulic fluid source for directly actuating the friction brake as a service brake. The assembly is characterized by a second actuator being in fluid communication with the first actuator and having a brake-off condition for storing fluid therein and a brake-on condition for releasing the stored fluid to the first actuator to actuate the friction brake as a parking brake.

A method of selectively actuating the friction brake assembly which includes the steps of storing fluid in the second actuator as the first actuator is responsive to fluid pressure from a fluid source to actuate the friction brake as a service brake and releasing the stored fluid from the second actuator to the first actuator to actuate the friction brake as a parking brake.

A hydraulic brake actuator assembly includes actuator means including an expandable chamber which is responsive to fluid pressure from a hydraulic fluid source for selectively actuating the friction brake. The assembly is characterized by the actuator means including a first inflexible annular casing being substantially U-shaped when viewed in cross section as having a pair of spaced legs and a first base portion therebetween. An annular diaphragm for operatively engaging the friction brake is fixedly mounted between the legs and spaced from the base portion to define the expandable chamber whereby fluid pressure expands the diaphragm to actuate the friction brake.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
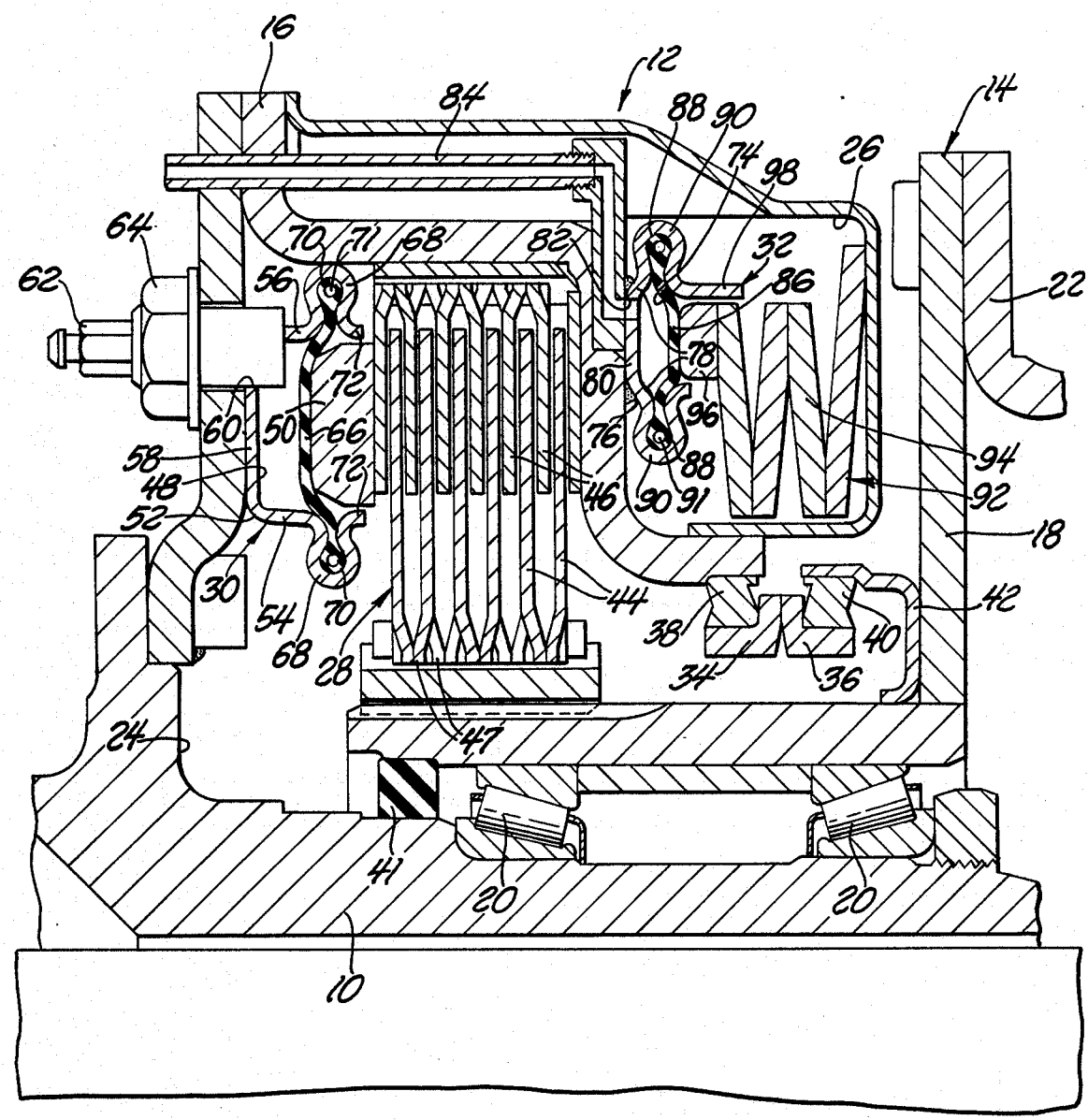
FIG. 1 is a fragmentary cross-sectional view of a first embodiment of the instant invention.

A brake assembly mounted on an axle 10 is generally shown at 12 in FIG. 1. The brake assembly includes a support housing generally indicated at 14, which includes a stationary portion 16 fixedly secured to the wheel axle 10 and a rotatable portion 18. The rotatable portion 18 is rotatably mounted on bearings 20 and includes means 22 for attachment to the wheel structure. The housing 14 forms two chambers 24 and 26. The chamber 24 is sealed for maintaining the brake assembly in a fluid environment. The fluid would be similar to a transmission fluid. The friction brake, generally indicated at 28, and the actuator therefor, generally indicated at 30, are housed within the first chamber 24 and the parking brake actuator, generally indicated at 32, is housed in the second chamber 26.

The stationary portion 16 of the housing 14 includes an annular L-shaped face seal 34 and the rotatable portion 18 includes a second annular L-shaped face seal 36, the annular seals being in sealing engagement to form a seal about the first compartment 24 where the stationary portion 16 and rotatable portion 18 of the housing 14 engage each other. The annular seals 34 and 36 are supported by annular support members 38 and 40 respectively. The annular support member 38 is attached to the member 16 and the annular support member 40 is attached within an annular bracket member 42 which, in turn, is fixedly secured to the rotatable housing 14. Thusly, a seal is perfected between the stationary and rotatable portions 16 and 18 of the housing 14. Another annular seal 41, is disposed between the rotatable portion 18 and the axle 10.

Generally, the friction brake shown in FIG. 1 includes a plurality of first disc members 44 supported by the rotatable portion 18 in a plurality of second disc members 46 supported by the stationary portion 16. To apply the friction brake 28, the brake actuator 30 compresses the discs 44 and 46 together, thereby preventing rotation of the rotatable portion 18. When the friction brake 28 is not applied, the discs 44 and 46 are biased apart by the coaction of integral teeth 47 to be in spaced relation to each other to allow for the rotation of the rotatable portion 18 and, accordingly, rotation of the attached wheel. The brake assembly 28 is more specifically described and claimed in applicant's copending application Ser. No. 422,704 filed concurrently with this application, which is incorporated herein by reference.

The assembly 12 includes first actuator means 30 which is responsive to fluid pressure from a hydraulic fluid source for directly actuating the friction brake 28 as a service brake. In other words, during normal usage of the vehicle upon which the assembly 12 is mounted, the first actuator means 30 would be responsive to fluid pressure from a hydraulic fluid source actuated by a mechanism such as a brake pedal to actuate the friction brake 28 as a service brake. The assembly 12 is characterized by including the second actuator means 32 which is in fluid communication with the first actuator means 30 and has a brake-off condition for storing fluid therein and a brake-on condition for releasing the stored fluid to the first actuator means 30 to actuate the friction brake 28 as a parking brake. Thusly, the second actuator means 32 provides a separate fluid circuit to actuate the fluid-actuated friction brake 28.

The first actuator means 30 includes an expandable chamber 48 and engagement means comprising an annular engagement member or ring 50, the engagement member 50 being operatively connected to the expandable chamber 48 for engaging the friction brake assembly 28 whereby expansion of the chamber 48 in response to fluid pressure from the fluid source moves the engagement member 50 to actuate the friction brake assembly 28. In other words, the first actuator means 30 functions in a bellows-like fashion in response to fluid pressure. As it expands, the engagement member 50 which is disposed between the expandable portion of the first actuator means 30 and the friction brake 28 is moved to compress the discs 44 and 46 into friction engagement. Alternatively, the friction brake can comprise a conventional disc brake mechanism or cone brake mechanism wherein the engagement member 50 would be operatively connected to a brake shoe to be moved into frictional engagement with a corresponding brake surface in response to expansion of the first actuator means 30.

Figure 2:
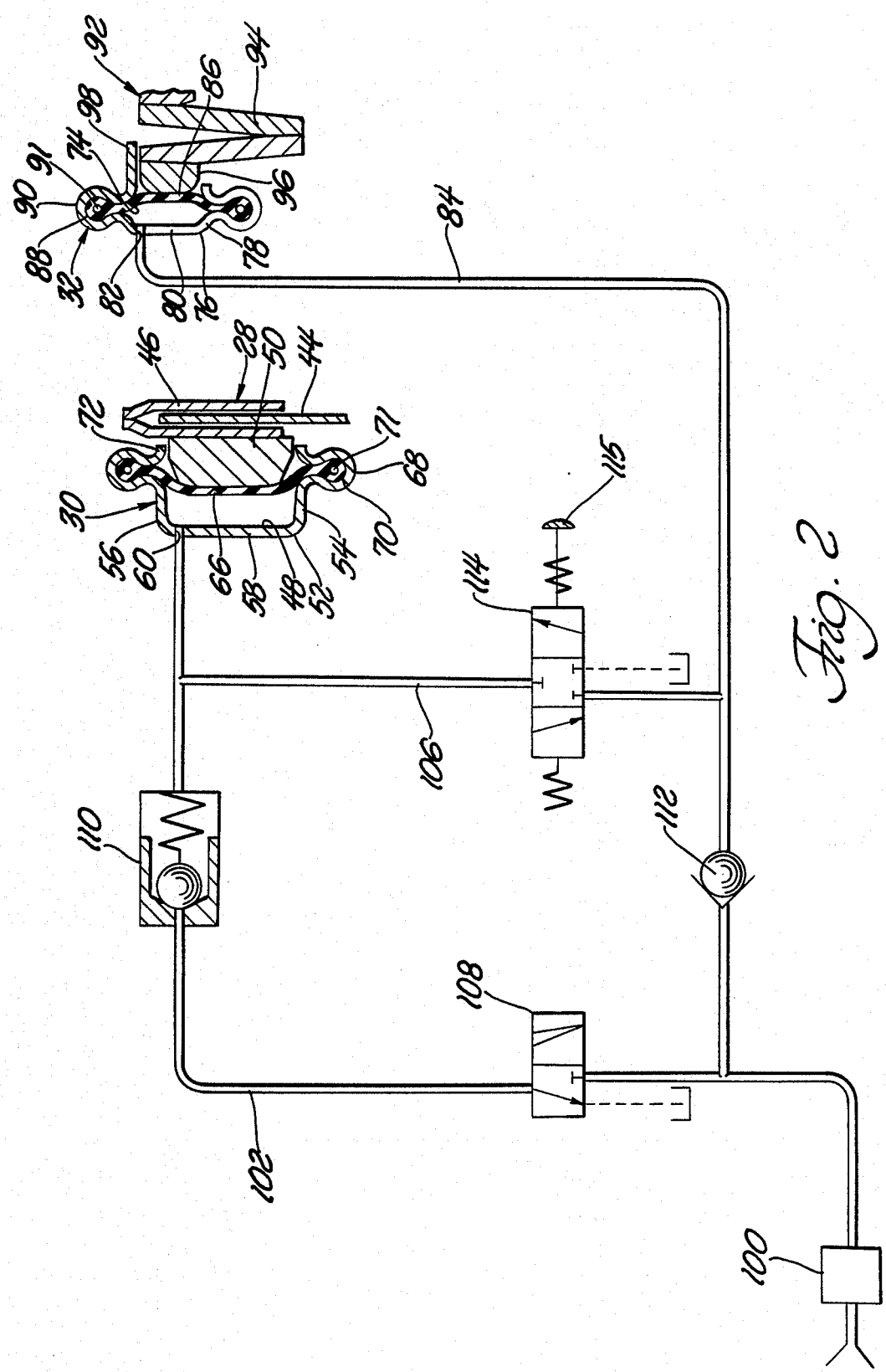
FIG. 2 is a schematic diagram of the hydraulic fluid circuit of the embodiment of FIG. 1.
Figure 5:
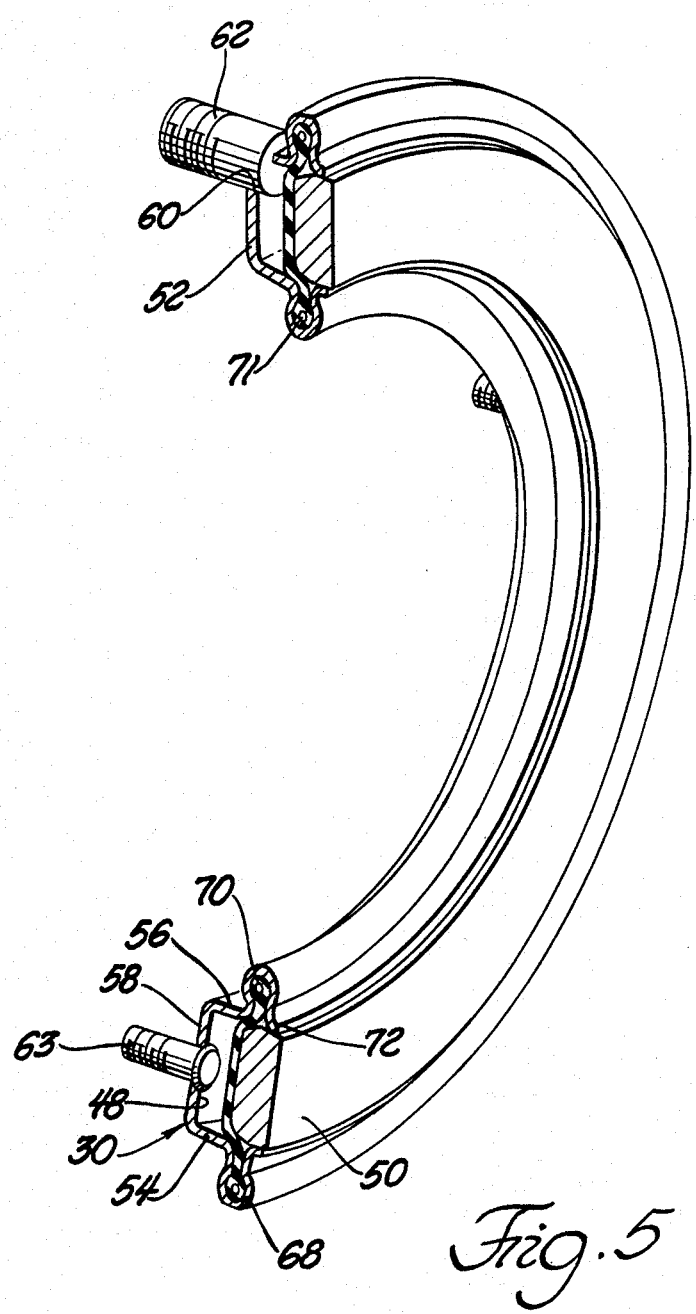
FIG. 5 is a perspective view in cross section of the hydraulic actuator of the first embodiment of the instant invention

As shown in FIGS. 1, 2 and 5, the first actuator means 30 includes an inflexible angular casing 52 which can be made from stamped steel. The casing 52 is substantially U-shaped when viewed in cross section. The casing 52 has a pair of spaced legs 54 and 56 and a base portion 58 therebetween. The base portion 58 includes an opening 60 therethrough for receiving a fluid inlet member 62. Mounting studs 63 secure the casing 52 to the support structure 16. The fluid inlet member 62 is fixedly secured to the stationary portion 16 of the housing 14 by nut member 64. The first actuator means 30 further includes an annular diaphragm 66 fixedly mounted between the legs 54, 56 of the casing 52 and spaced from the base portion 58 thereof. The diaphragm 66 can be made from an expandable fabric such as rubber or an elastomer. Each leg 54 and 56 of the casing 52 includes a substantially C-shaped crimped portion 68. Each end or periphery of the diaphgragm 66 includes an expanded edge portion 70 disposed within the crimped portion 68. An annular wire 71 is embedded within and about the expanded portion 70. The crimped portions 68 retain the expanded portions 70 therein to support the diaphragm 66 therebetween. Thusly, the casing 52 and diaphragm 66 define the expandable chamber 48, the engagement member 50 being adhered to or in engagement with the diaphragm 66.

The diaphragm actuator means 30 solves many of the complications of the piston-actuated disc brake by being more simple and more readily produced. Additionally, the diaphragm actuator assembly 30 provides sufficient actuating pressure while eliminating the large pistons and piston seals. Thusly, the diaphragm-actuated assembly 30 provides force equal to the piston brake at relatively low line pressure.

The diaphragm actuator 30 means can be thoroughly tested prior to assembly into the brake. It can also be bench-assembled complete and bench-tested and then readily assembled onto the axle 10. It can, likewise be distributed as an aftermarket replacement unit.

In operation, hydraulic fluid entering through the fluid inlet 62 into the expandable chamber 48 expands the chamber 48 by expanding or stretching the diaphragm 66 to move the engagement member 50 to compress the discs 44 and 46 together thereby resulting in a brake-actuated condition. Release of the fluid pressure allows for the fluid within the expandable chamber 48 to escape through the fluid inlet 62. The biasing teeth 47 of the discs 44 and 46 act as springs to force the engagement member 50 against the diaphragm 66 to compress or contract the expandable chamber 48 and force the fluid therefrom.

The casing 52 includes guide means for guiding the reciprocating movement of the engagement member 50 as the engagement member 50 is moved by the expansion of the expandable chamber 52. More specifically, the guide means includes an annular flange 72 extending outwardly beyond the diaphragm 66 from each of the legs 54 and 56 of the casing 52. The ring-shaped engagement member 50 is disposed between the flanges 72 and against the diaphragm 66 for reciprocating axial movement between the flanges 72. Thusly, the engagement member 50 is aligned in the appropriate position between the diaphragm 66 and discs 44 and 46 for reciprocating movement therebetween.

The second hydraulic actuator 32 is disposed in the second portion 26 of the housing 14. The second actuator 32 includes an expandable chamber 74 having a similar construction to the expandable chamber 52 of the first actuator. More specifically, the second actuator 32 includes an inflexible annular casing 76 which is substantially U-shaped in cross section as having a pair of spaced legs 78 and a base portion 80 therebetween. The legs 78 of the second actuator 32 are less prominent than the legs 54, 56 of the first actuator 30 accounting for the smaller size of the second actuator 32. The actuator 32 further includes a hydraulic fluid inlet 82 in fluid communication with the fluid inlet 62 of the first actuator 30 via a fluid conduit 84, which is described in greater detail below. The second actuator 32 further includes an annular diaphragm 86 having expanded edge portions 88 supported in C-shaped crimped portions 90 of the casing 76 in a similar fashion as the expanded portion 70 of the diaphragm 66 and the C-shaped portions 68 of the casing 52. A wire 91 is disposed in the expanded portions 88. In other words, the C-shaped portions 90 are crimped about the expanded portions 88 of the diaphragm 86 to support the diaphragm 86 between the legs 78 of the casing 76. Thusly, the casing 76 and diaphragm 86 define the second expandable chamber 74. The diaphragm 86 engages biasing means, generally indicated at 92. The biasing means 92 comprises a compressible annular Belleville spring 94, the spring 94 having an annular projecting portion 96 extending from one edge thereof.

The casing 76 includes guide means for guiding the reciprocating movement of the spring 94 and projecting portion 96 as it is moved by the expansion and contraction of the expandable chamber 74. The guide means includes an annular flange 98 extending outwardly beyond the diaphragm 86 from one of the legs 98 of the casing 76. The annular projecting portion 96 of the biasing means 92 is disposed against the flange 98 of the casing 76 and against the diaphragm 86 for reciprocating movement along the flange 98 as the diaphragm 86 is expanded or contracted.

In operation, hydraulic fluid, through the conduit 84 and inlet 82, expands the expandable chamber 74 by extending the diaphragm 86 to compress the spring 94. Upon reduction of pressure within the expandable chamber 74, the spring 94 expands to contract the expandable chamber 74 by compressing the diaphragm 86 towards the base portion 80 of the casing 76 thereby forcing hydraulic fluid out of the expandable chamber 74 and into and through the conduit 84. Thusly, the Belleville spring 94 functions in a similar fashion as the discs 44 and 46 to compress or contract the expandable chamber 74 by providing a biasing force against the diaphragm 86.

The hydraulic fluid circuit of the instant invention is schematically shown in FIG. 2. The circuit includes a fluid source 100 and a first fluid carrying conduit 102 between the fluid source 100 and the first actuator 30. The fluid source 100 can be any hydraulic fluid source known to the art, such as a master hydraulic cylinder. The fluid source 100 may be actuated by an actuator such as a brake pedal in the passenger compartment of the vehicle. The circuit further includes the second fluid-carrying conduit 84 between the fluid source 100 and the second actuator 32. A third fluid-carrying conduit 106 is disposed between the first and second conduits 102 and 84 respectively. A typical service brake value 108 controls fluid flow between the fluid source 100 and the first actuator 30, the valve being controlled by a brake pedal within the passenger compartment. An automatic hydraulic slack adjuster 110 may be disposed on the first fluid-carrying conduit 102 beyond the brake valve 108 to continually adjust the volume of fluid pressure in the first actuator 30. A check valve 112 is disposed on the second fluid-carrying conduit 84. The check valve 112 locks pressure in the second actuator 32, even if there is no hydraulic pressure coming from the fluid source 100. In other words, the check valve 112 is a one-way valve allowing fluid flow from the fluid source 100 to the second actuator 32 but not in the reverse direction.

The assembly further includes control means disposed in the third conduit 106 for controlling fluid flow therethrough and, accordingly, for controlling the fluid flow between the first actuator 30 and second actuator 32. The control means includes a three-way valve 114 having a first position for allowing fluid flow from the second actuator 32 to the first actuator 30 resulting in a brake-actuated condition and a second position for releasing fluid from the first actuator 30 resulting in the brake-off condition and a third position preventing fluid flow in the third conduit 106 to allow the first actuator 30 to apply the friction brake 28 as a service brake. More specifically, when the engine of a vehicle is operating and the fluid source 100 is generating a fluid pressure through conduits 102 and 84, the hydraulic pressure from the fluid source 100 through conduit 102 can selectively actuate the expansion of the first expandable chamber 48 to actuate the friction brake 28 as a service brake. The pressure from the fluid source 100 through conduit 84 also expands the second expandable chamber 74 against the biasing pressure of the Belleville spring 94. The valve 114, functioning as the control means between the first conduit 102 and second conduit 84 prevents fluid flow between the conduits 102 and 84. Thusly, the second actuator 32 is maintained in the brake-off condition in which it stores hydraulic fluid. When the engine of the vehicle is turned off, such as when the vehicle is parked, there is no fluid pressure applied from the fluid source 100. The check valve 112 prevents fluid bleading from the second actuator 32 back to the fluid source 100. The parking brake lever 115 may be actuated to momentarily move the three-way valve 114 inwardly, thus allowing the fluid within the expandable chamber 74 to flow through conduits 84 and 106 to conduit 102 and into the expandable chamber 48, thereby expanding the expandable chamber 48 and actuating the friction brake 28 to function as a parking brake. As previously described above, the Belleville spring 94 expands to positively force the fluid from the expandable chamber 74 through conduits 84, 106, and 102 to expand the first expandable chamber 48. To disengage the parking brake, a parking brake lever 115 moves the three-way valve 114 momentarily out whereby the hydraulic fluid pressure within the first expandable chamber 48 is released through the conduit 106 thereby allowing the discs 44 and 46 to separate, thereby effectively releasing the parking brake mechanism. The return of fluid pressure from the fluid source 100, when the engine is turned on, once again expands the first expandable chamber 74 thereby resetting or reenergizing the parking brake actuating mechanism with hydraulic fluid.

Figure 3:
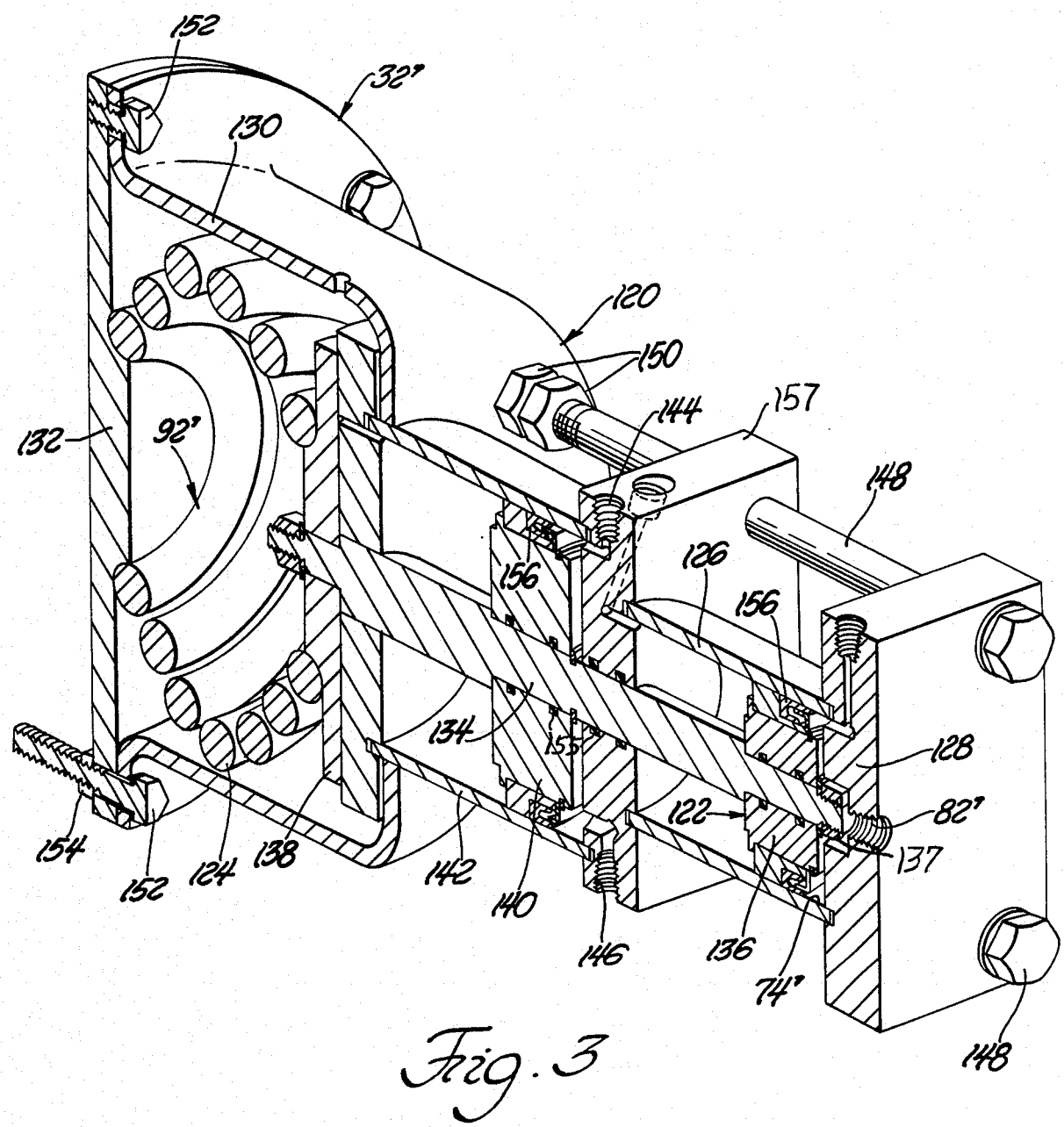
FIG. 3 is a perspective view in cross section of a second embodiment of the instant invention in the brake-off condition.
Figure 4:
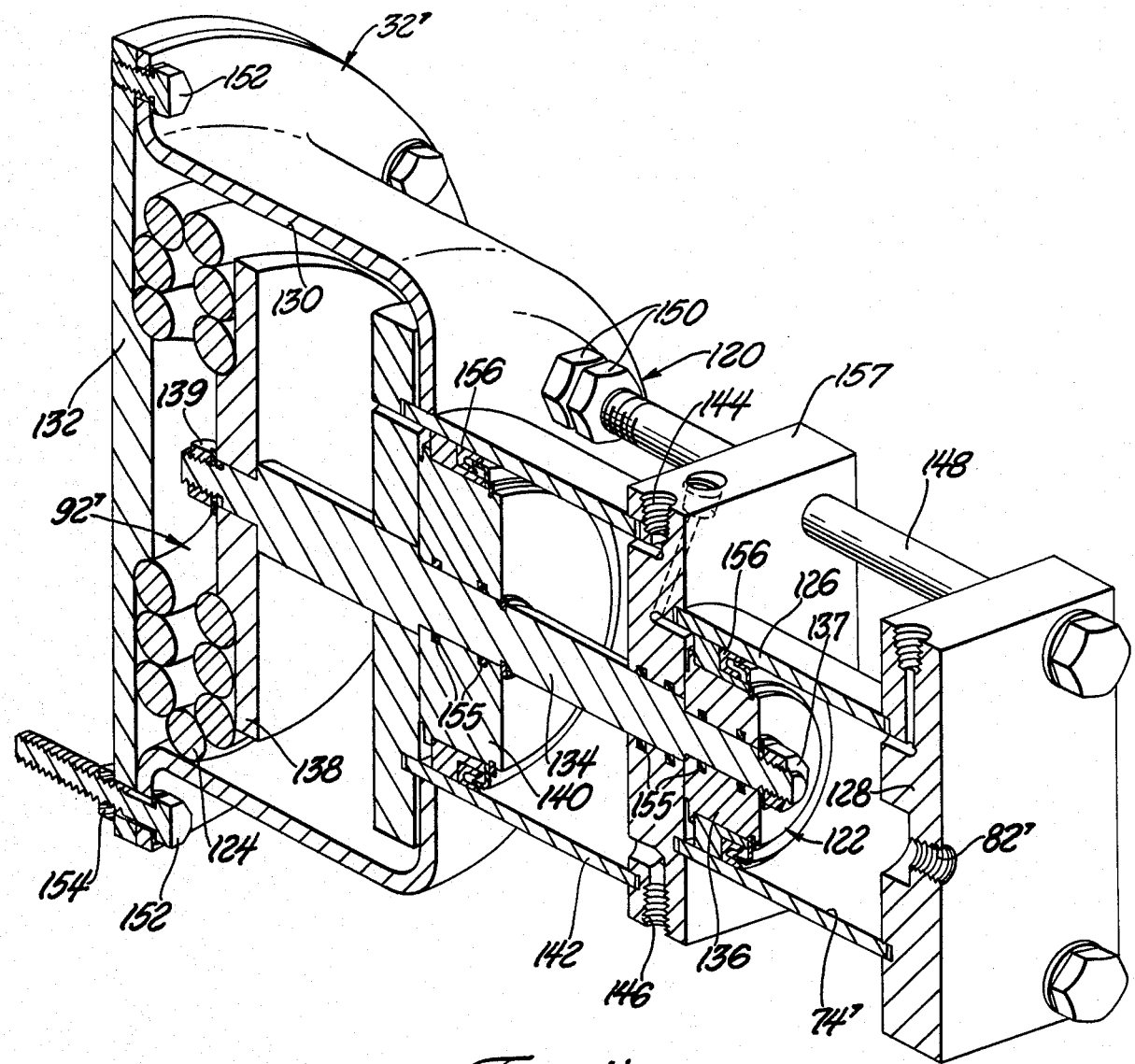
FIG. 4 is a perspective view in cross section of the second embodiment of the instant invention in the brake-actuated condition.

A second embodiment of the second actuator is generally shown at 32' in FIGS. 3 and 4. Primed like numbers are used to designate structure having the same function as structure of the second actuator 32 shown in FIGS. 1 and 2.

The second actuator 32' is in fluid communication with the first actuator 30 and has a brake-off condition for storing fluid therein, as shown in FIG. 3, and a brake-on condition for releasing the stored fluid to the first actuator 30 to actuate the friction brake 28 as a parking brake, as shown in FIG. 4. Control means, such as the three-way valve 114 as shown in FIG. 2 may be used to control fluid flow between the second actuator 32' and the first actuator 30 thereby controlling the second actuator 32' between the brake-on and brake-off conditions. The actuator 32' includes an expandable chamber 74' for storing the fluid when the second actuator 32' is in the brake-off condition. Additionally, the second actuator further includes biasing means 92' for applying a biasing force against the expandable chamber 74' to expel the fluid stored therein when the second actuator 32' is in the brake-on condition.

The second actuator 32' includes a housing generally indicated at 120. The housing 120 has a fluid inlet or port 82' and piston means generally indicated at 122 disposed within the housing 120 defining the expandable chamber 74'. The biasing means 92' includes a spring 124 for biasing the piston means 122 towards the fluid port 82' to force fluid from the first chamber 74' to the first actuator 30 when the second actuator 32' is in the brake-on condition, as controlled by the valve 114, as shown in FIG. 2 or merely by the hydraulic line pressure as described below.

The housing 120 is divided into three sealed portions. The housing 120 includes a first portion 126 having a front wall 128, the front wall 128 including the fluid outlet 82'. The housing 120 further includes a second portion 130 including a back wall 132. The piston means 122 includes a rod member 134 and a first piston 136 mounted on the rod 134 by nut 137 and disposed in the first portion 126 to define the expandable chamber 74'. A second piston or reaction plate 138 is fixedly mounted on the rod 134 by nut 139 and is disposed in the second portion 130. The spring 124 is disposed between the back wall 132 and the reaction plate or second piston 138. The control means for controlling the expansion of the expandable chamber 74' includes the fluid source 100, as shown in FIG. 2, and a third piston 140 mounted on the rod member 134. The housing 120 includes a third portion 142 having a fluid inlet 144 and an outlet 146 for receiving fluid pressure from the fluid source 100. The portions 126, 142, and 130 of the housing 120 are secured together by bolts 148 and nuts 150. The back wall 132 is secured to the third portion 130 by bolts 152 and nuts 154. The piston means 122 includes U-shaped seals 156 disposed between the pistons 136 and 140 and the inner walls of the first and third portions 126 and 142. Ring seals 155 are disposed between the pistons 136 and 140 and the rod 134 and between the wall 157 which divides the first and third chambers 126, 142 and the rod 134. Thusly, the first and third portions 126 and 142 comprise sealed chambers.

The third piston 140 is disposed in the third portion 142 whereby fluid pressure from the fluid source 100 moves the third piston 140 within the third portion 142 to move the second piston 138 against the biasing force of the spring 124 and to move the first piston 136 away from the fluid oulet 82' to store fluid in the expandable chamber 74' of the first portion 126 in the brake-off condition. In the brake-on condition, the loss of fluid pressure from the fluid source 100 in the third portion 142 as when the engine of the vehicle is turned off, allows the spring 124 to bias the piston means 122 to move the first piston 136 towards the fluid inlet or port 82' to force the stored fluid therein to the first actuator 30 through the conduits 84, 106 and 102 as schematically shown in FIG. 2. Thusly, the spring 124 of the actuator 32' shown in FIGS. 3 and 4 is compressed during the expansion of the expandable chamber 74' as is the Belleville spring 94 compressed or contracted by the expansion of the first expandable chamber 74. Similarly, the spring 124 forces the compression or contraction of the expandable chamber 74' to force fluid through the first actuator 30 in the brake-on condition just as the Belleville spring 94 expands to compress or contract the expandable chamber 74 to force fluid therefrom.

The instant invention further provides a method of selectively actuating the friction brake 28. The method comprises the steps of storing fluid in the second actuator 32, 32' as the first actuator 30 is responsive to fluid pressure from the fluid source 100 to actuate the friction brake 28 as a service brake and releasing the stored fluid from the second actuator 32, 32' to the first actuator 30 to actuate the friction brake 28 as a parking brake. The method further includes the steps of controlling the fluid flow from the fluid source 100 to the first actuator 30 to hydraulically actuate the friction brake 28 as a service brake and expanding the second actuator 32, 32' with fluid from the fluid source 100 while preventing back flow from the second actuator 32, 32' to the fluid source 100 and preventing flow between the first and second actuators 30, 32, 32' to store the fluid in the second actuator 32, 32'. Finally, the method is further defined as removing the fluid pressure from the fluid source 100 to the first actuator 30, allowing fluid to flow from the second actuator 32, 32' to the first actuator 30, and biasing the second actuator 32, 32' to contract and release the stored fluid from the second actuator 32, 32' to the first actuator 30 to actuate the friction brake 28 as a parking brake.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A hydraulic brake actuator assembly (12) for selectively actuating a friction brake (28), said assembly comprising; first actuator means (30) responsive to fluid pressure from a hydraulic fluid source (100) for directly actuating the friction brake (28) as a service brake; second actuator means (32,32') in fluid communication with said first actuator (3) and having a brake-off condition for storing fluid therein and a brake-actuated condition for releasing the stored fluid to said first actuator means (30) to actuate the friction brake (28) as a parking brake; fluid control means for controlling said second actuator means (32,32') between said brake-actuated and brake-off conditions, said second actuator means (32,32') including an expandable first chamber (74,74') for storing the fluid when said second actuator means (32,32') is in said brake-off condition, said second actuator means (32,32') further including biasing means (92,92') for applying a biasing force against said first expandable chamber (74,74') to expel the fluid stored therein when said second actuator means (32,32') is in said brake-actuated condition, said first actuator means (30) including a second expandable chamber (48) in fluid communication with said first expandable chamber (74,74') to said second chamber (48) and engagement means (50) operatively connected to said second expandable chamber (48) for engaging the friction brake (28), said engagement means (50) comprising an annular engagement member (50) for reciprocating axial movement against the friction brake (28) in response to expansion of said first chamber (74,74'), whereby expansion of said second expandable chamber (48) in response to fluid pressure released from said first expandable chamber (74,74') moves said engagement means (50) to actuate the friction brake (28); said second actuator means (32) including substantially U-shaped in cross section as having a pair of spaced second legs (78) and a second base portion (80) therebetween and having at least one hydraulic fluid inlet (82) in fluid communication with said fluid inlet (62) of said first actuator (30), said second actuator means (32) further including an annular second diaphragm (86) fixedly mounted between said second legs (78) of said second casing (76) and spaced from said second base portion (80) thereof to define said first expandable chamber (74), said second diaphragm (86) engaging said biasing means (92).

2. An assembly as set forth in claim 1 further characterized by said second casing (76) including second guide means for guiding the reciprocating movement of said biasing means (92) as said biasing means (92) is moved by the expansion and contraction of said first expandable chamber (74).

3. An assembly as set forth in claim 2 further characterized by said second guide means including a second annular flange (98) extending outwardly beyond said second diaphragm (84) from one of said second legs (78) of said second casing (76), said biasing means including a Belleville spring (94) having an annular projecting portion (96) extending from one edge thereof, said projecting portion (96) being disposed against said second flange (98) and against said second diaphragm (86) for reciprocal movement along said second flange (98).

* * * * *